United States Patent

Sano et al.

[11] Patent Number: 5,899,965
[45] Date of Patent: May 4, 1999

[54] PARTS IDENTIFYING METHOD

[75] Inventors: Kimiaki Sano, Kawanishi; Junichi Hada, Katano, both of Japan

[73] Assignee: Matsushita Electric Industrial Co., Ltd., Japan

[21] Appl. No.: 08/835,908

[22] Filed: Apr. 11, 1997

[30] Foreign Application Priority Data

Apr. 16, 1996 [JP] Japan ..................... 8-93706

[51] Int. Cl.$^6$ ..................... G06T 1/00
[52] U.S. Cl. ............. 702/150; 702/155; 382/168; 382/170; 382/190; 348/94
[58] Field of Search ............. 364/559, 560, 364/561, 562, 563, 564; 382/162, 168, 169, 170, 171, 172, 190, 205; 348/66, 87, 91, 92, 94, 95, 125, 126; 702/150, 155

[56] References Cited

U.S. PATENT DOCUMENTS

| | | | |
|---|---|---|---|
| 4,772,125 | 9/1988 | Yoshimura et al. | 356/237 |
| 5,093,797 | 3/1992 | Yotsuya et al. | 364/489 |
| 5,113,215 | 5/1992 | Nishibe | 354/408 |
| 5,136,661 | 8/1992 | Kobayasi et al. | 382/48 |
| 5,138,671 | 8/1992 | Yokoyama | 382/52 |
| 5,204,910 | 4/1993 | Lebeau | 382/8 |
| 5,408,537 | 4/1995 | Major | 382/8 |
| 5,471,407 | 11/1995 | Akasaka et al. | 364/559 |
| 5,490,084 | 2/1996 | Okubo et al. | 364/489 |
| 5,574,800 | 11/1996 | Inoue et al. | 382/149 |
| 5,646,681 | 7/1997 | Okazaki | 348/87 |
| 5,682,440 | 10/1997 | Yukawa | 382/205 |
| 5,706,363 | 1/1998 | Kikuchi | 382/113 |

*Primary Examiner*—John Barlow
*Assistant Examiner*—Patrick Assouad
*Attorney, Agent, or Firm*—Parkhurst & Wendel, L.L.P.

[57] ABSTRACT

The front end position of the leads of a leaded part can be accurately detected even from image data having a noise signal mixed therein. A method including a step for defining, with respect to an electronic part having a plurality of leads to be packaged on a board by an electronic parts packaging plant, a two-dimensional test window having a rectangular coordinate system with the X-axis extending parallel with the direction in which the leads are juxtaposed and the Y-axis perpendicular to the X-axis; a lead emphasizing step for emphasizing the light intensity of the lead regions of image data obtained by photographing the electronic part in the test window; a data producing step for producing one-dimensional histogram data which indicates the distribution of light intensity along the Y-axis on the basis of the image data after having the light intensity of its lead regions emphasized; and a positioning step for calculating the Y-coordinate of the lead position in the test window on the basis of the histogram data thereon.

8 Claims, 9 Drawing Sheets

PARTS IDENTIFYING METHOD

FIELD OF THE INVENTION

The present invention relates to a parts identifying method for identifying electronic parts to be packaged in an electronic parts packaging plant.

BACKGROUND OF THE INVENTION

In recent years, in the field of the surface packaging of electronic parts, the packaging of leaded parts, such as QFP or SOP, has been practiced with increasing frequency, and to ensure satisfactory packaging of these parts without positional deviation during mounting, it has become necessary to identify the position of the leads of the parts. Particularly, the identification of the position of the front ends of the leads is a very important factor in positioning the parts or knowing the parts shape during packaging.

A conventional parts identifying device will now be described using FIGS. 6, 7 and 8. A description only of the parts identifying process using an identifying system will be given herein, while leaving out a description of the process for packaging electronic parts.

In FIG. 6, the numeral 101 denotes an electronic part depicted in image data to be processed for identification by an identifying system in an electronic parts packaging plant. The electronic part 101 is equipped with a plurality of leads 102 on an optional side or sides thereof. The leads 102 are disposed in parallel on a side or sides of the electronic part 101.

The parts identifying process using a conventional parts identifying device will now be described.

First, at the step #11 of a flowchart shown in FIG. 8, a test window 103 shown in FIGS. 6 and 7 is defined. The test window 103 is used to define the range for processing the image data on the whole or part of the electronic part obtained by a pickup tube used when identifying parts. The X-direction of the test window 103 is determined by one method or another such that it is parallel with the direction in which the leads 102 are juxtaposed. Such method will not be described herein.

At the step #12 of the flowchart shown in FIG. 8, the values of light intensity in the X-direction within the test window are added for each Y-coordinate to provide histogram data 104 to be used in the identification process.

This process is intended to detect the position of the leads 101 in the lengthwise direction, i.e., the Y-direction of the test window 103 and calculate the front end position of the leads 102; therefore, even with the histogram data 104 produced in the aforesaid process, the detection of the front end position of the leads 102 is possible. The histogram data 104 for effecting said process is produced in the manner shown in FIG. 7.

Finally, at the step #13 of the flowchart shown in FIG. 8, a differential process is performed on the histogram data 104 to produce differential data 105 shown in FIG. 7. This process is a process for calculating the position at which the rate of change of light intensity in the histogram data 104 is at the maximum. In the differential data 105, this position corresponds to the peak point 106 where the differential value is at the maximum. Thus, the position of the peak point 106 corresponds to the Y-direction position of the leads 102 in the test window 103. Thus, the front end position of the leads 102 present in the test window 103 is calculated from data on the relative position between the test window 103 and the reference position of the electronic part 101 with respect to the nozzle center or the like.

In the case where the leads 102 are present on a plurality of sides of the electronic part 101, said processing is performed for each of the test windows associated with the plurality of sides, whereby the front end position of the electronic parts can be identified and so can be the shape of the electronic part 101.

However, in the parts identifying process using said conventional parts identifying device described above, if there is a noise 107 in the test window 103, as shown in FIG. 9, there are produced histogram data 108 and differential data 109 as shown in this figure. Since the differential date 109 has a plurality of peak points, such as shown at a, b and c, there has been a problem that despite the fact that the actual front end position of the leads is the position corresponding to the peak point a of the differential data 109, the position corresponding to the peak point b or c would be erroneously identified as the front end position of the leads, depending upon the method for peak point detection employed.

DISCLOSURE OF THE INVENTION

The present invention solves the above problem and provides a parts identifying method which, even from image data having a mixture of pickup camera signal and noise signal which is obtained by photographing said leaded part, is capable of correctly detecting the front end position of the leads of the photographed leaded part without being influenced by the noise signal.

A parts identifying method for identifying the position of an electronic part comprises a step for defining, with respect to an electronic part having a plurality of leads to be packaged on a board by an electronic parts packaging plant, a two-dimensional test window having a rectangular coordinate system with the X-axis extending parallel with the direction in which said leads are juxtaposed and the Y-axis perpendicular to said X-axis, a lead emphasizing step for emphasizing the light intensity of the lead regions of image data corresponding to said electronic part in said test window, a data producing step for producing one-dimensional histogram data which indicates the distribution of light intensity along the Y-axis on the basis of the image data in the lead regions having their light intensity emphasized by said lead emphasizing step, and a positioning step for calculating the Y-coordinate of the lead position in said test window on the basis of the histogram data produced by said data producing step. Thus, even from image data having a mixture of photograph signal and noise signal which is obtained by photographing said leaded part, it is possible to correctly detect the front end position of the leads of the photographed leaded part without being influenced by the noise signal.

A parts identifying method according to the invention is also characterized in that the lead emphasizing step emphasizes the light intensity of the lead regions in that a multiplication between one-dimensional lead detecting data in which lead-existing positions are assigned a positive value and lead-nonexisting positions a zero or negative value, and as image data in the test window, the values of light intensity of a row of pixels having the same Y-coordinate is performed for all pixels in said row of pixels to convert said image data so as to emphasize the light intensity of the lead regions.

A parts identifying method according to the invention is also characterized in that the data producing step produces histogram data by adding the values of light intensity of a row of pixels having the same Y-coordinate in the test window.

A parts identifying method according to the invention is further characterized in that the positioning step calculates the Y-coordinate in the test window on the basis of the point having the highest rate of change of light intensity which is detected from the histogram data, said Y-coordinate corresponding to said point.

A parts identifying method according to the invention is further characterized in that the lead detecting data has a given period.

A parts identifying method further in accordance with the present invention is characterized in that the lead emphasizing step prepares a plurality of lead detecting data obtained by effecting coordinate transformation such that on the basis of lead position having a coordinate axis perpendicular to the X-axis and calculated from the image data on an electronic part to be identified, with a positive value assigned to the lead-existing position and a zero or negative value to the lead-nonexisting position, with X-coordinate positions for multiplication involving the image data differ from each other, wherein multiplication between said plurality of lead detecting data and as image data in the test window the values of light intensity of a row of pixels having the same Y-coordinate is performed for all pixels in said row of pixels to convert said image data so as to emphasize the light intensity of the lead regions.

Thus, by making multiplication of a plurality of histogram data different in phase, the emphasis of light intensity of the lead regions of the electronic part can be made in a stabilized manner.

A parts identifying method according to the invention is also characterized in that the lead detecting data is a sine wave. By making a plurality of histogram data different in phase into a sine function, the invention can easily be applied to a variety of parts different in lead-to-lead distance. Further, in the case of leaded parts having a fixed lead width and a fixed lead pitch, the lead detecting data storage capacity can be reduced by making lead detecting data into a periodic function.

DESCRIPTION OF EMBODIMENTS

Embodiments of the parts identifying method of the invention will now be described with reference to FIGS. 1 through 5.

First Embodiment

First, image data obtained by a parts identifying device for embodying a parts identifying method according to the first embodiment will be described.

Figure 1:
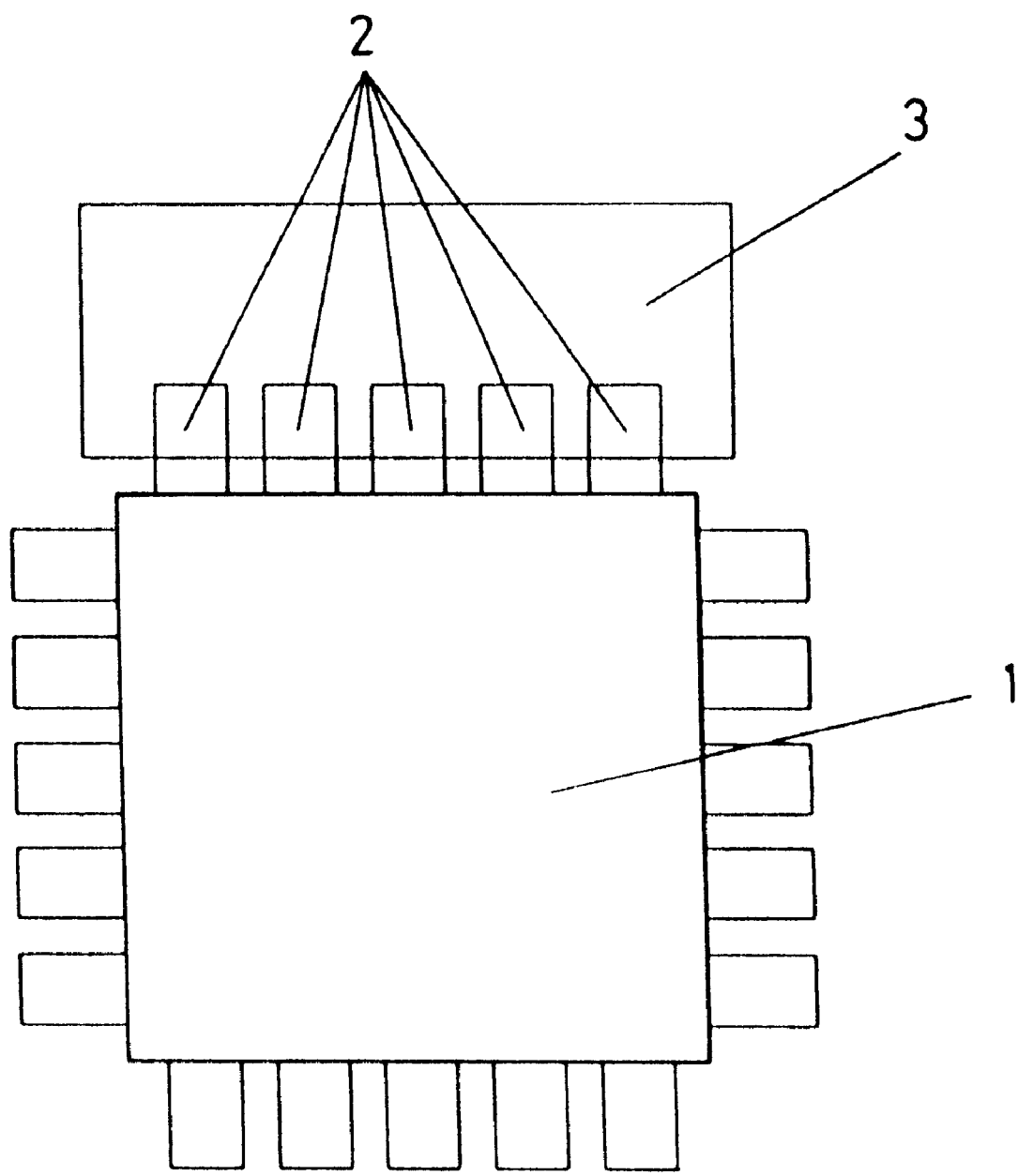
FIG. 1 is a plan view of image data which is to be processed by a parts identifying method according to the present invention.

In FIG. 1, the numeral 1 denotes an electronic part depicted in photographed image data, said part having a plurality of leads 2 on any desired side thereof. The leads 2 are disposed on a side or sides of the electronic part 1 and equispaced in parallel with each other.

As for the image data to be used in the parts identifying method of the present invention, even if the image data to be inputted is a portion of the electronic part 1, there is no problem provided that the portions of the leads 2 to be processed have been photographed.

Figure 2:
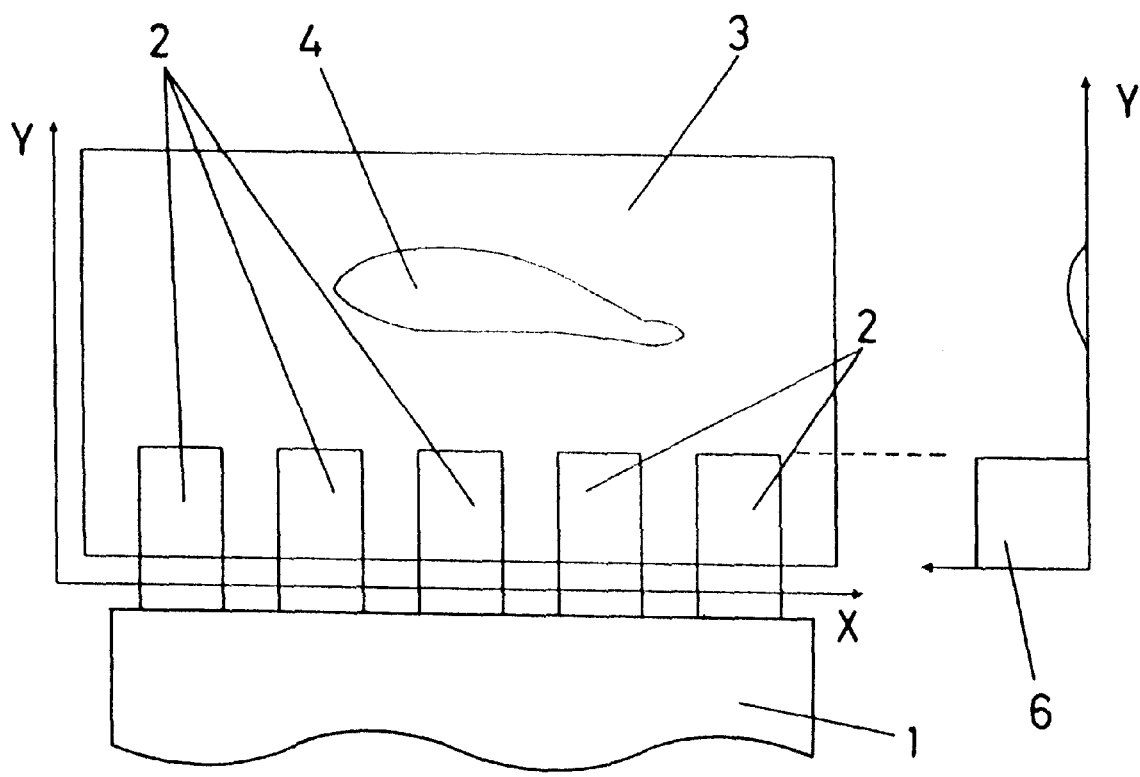
FIG. 2 is a plan view of image data to be processed by a parts identifying method according to a first embodiment of the invention.
Figure 2:
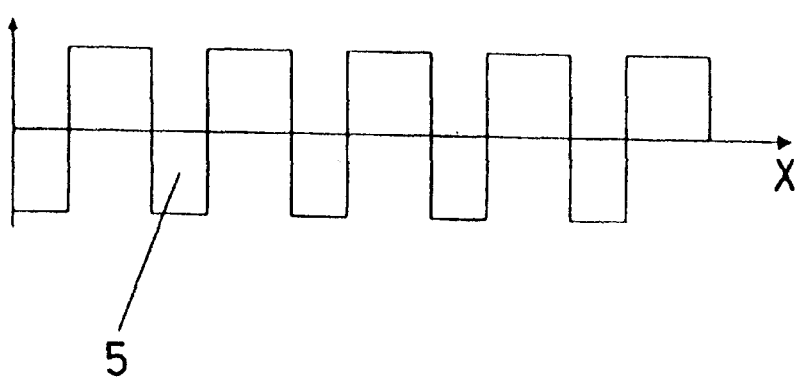

In FIG. 2, the numeral 4 denotes a noise present in the image data in a test window to be later described, said noise being a bright portion which occurs owing to a variation in the shape of electronic parts and a change in environment for identification. The numeral 5 denotes lead detecting data. This data is computed from the data on the shape of the electronic part 1 to be identified and has a change which corresponds to the spacing between the leads 2. Further, this lead detecting data 5 may not be so rigorous; what is required is that it have a positive value in the lead-existing portions and a zero or negative value in the lead-nonexisting portions.

Figure 6:
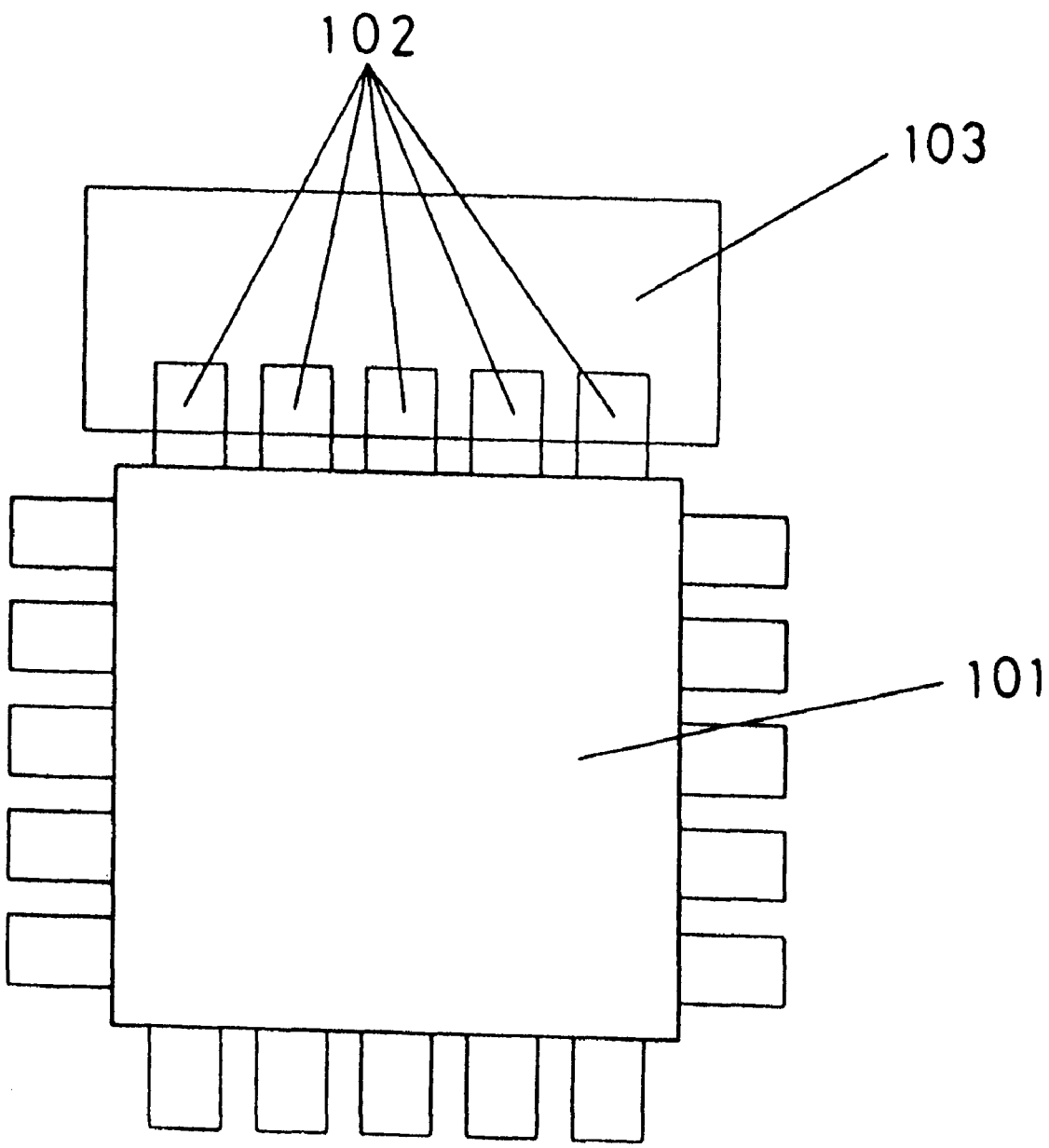
FIG. 6 is a plan view of image data to be processed by a conventional parts identifying method.
Figure 7:
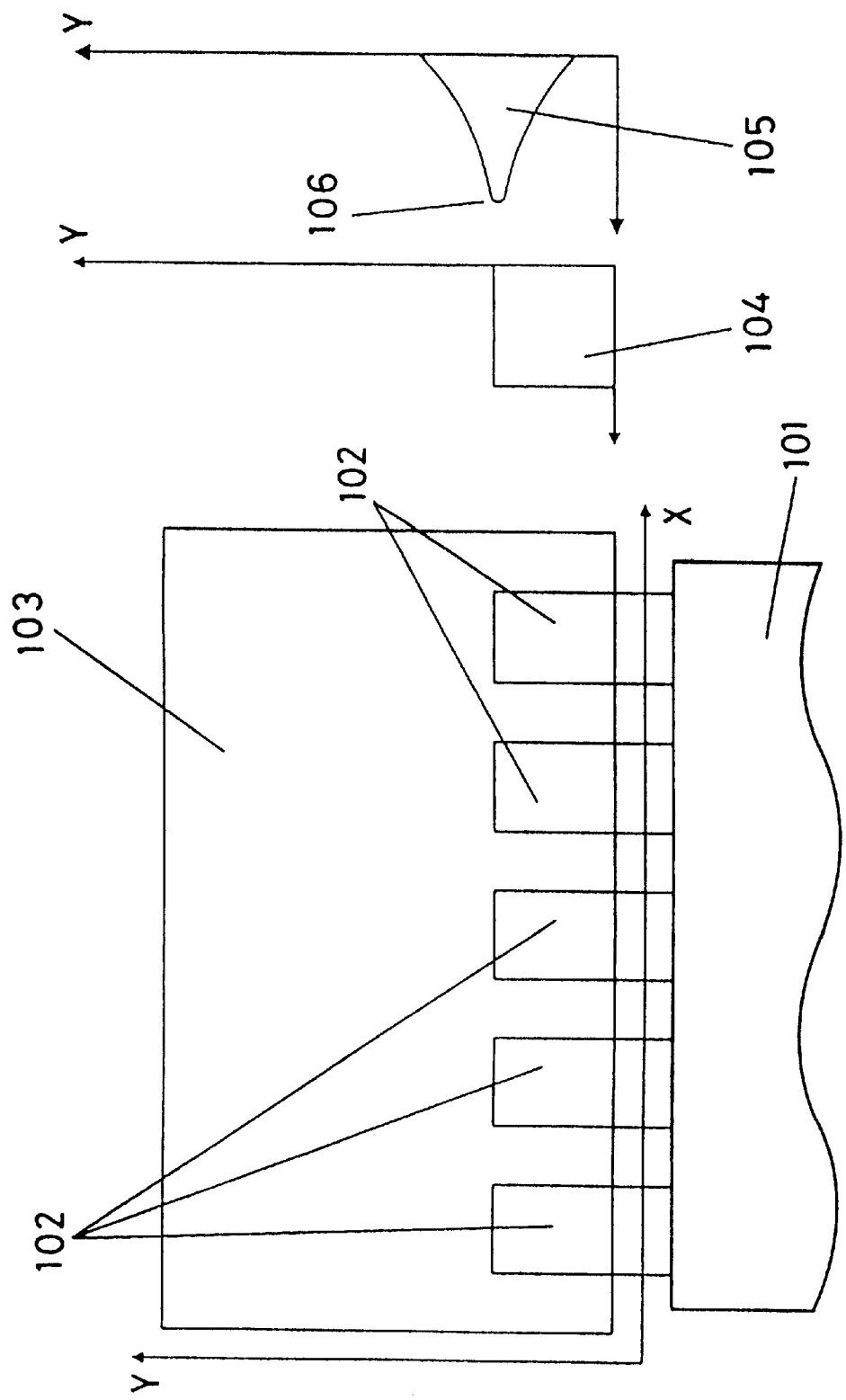
FIG. 7 is a plan view for explaining the conventional process.

The rest of the arrangement is the same as in the conventional example shown in FIGS. 6 and 7.

The parts identifying process will now be described with reference to the parts identifying method applied to the electronic part 1 depicted in the image data arranged in the manner described above.

Figure 3:
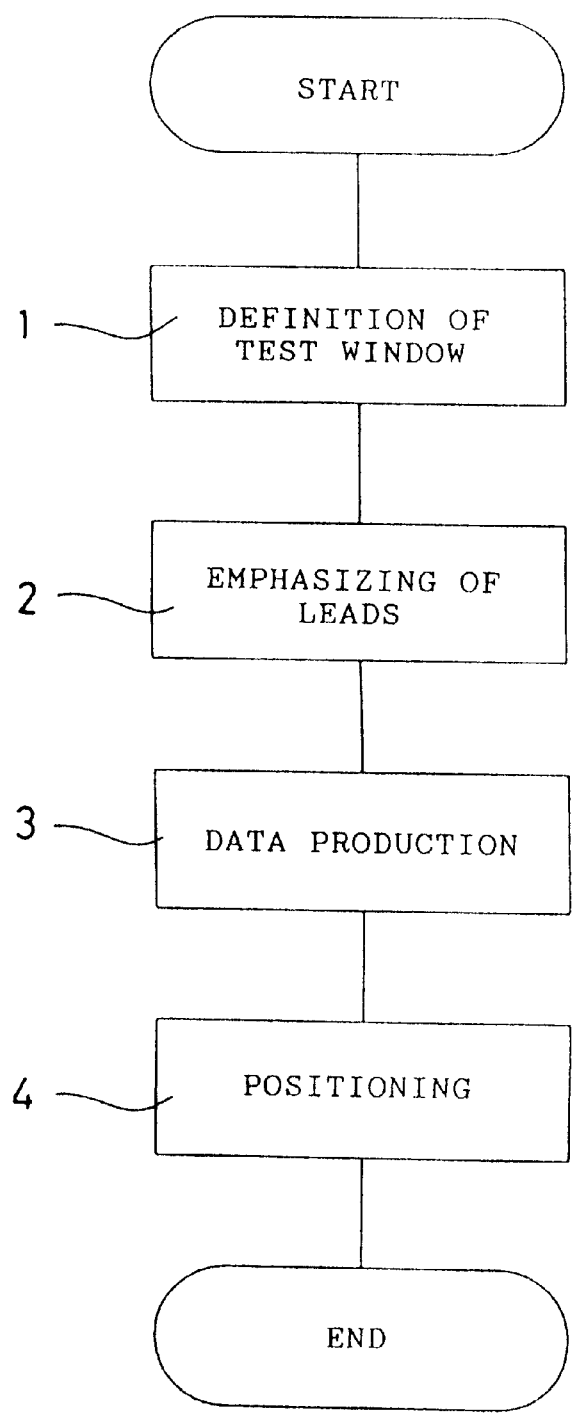
FIG. 3 is a flowchart showing the processing steps of the parts identifying method of the invention.

First, at the step #1 of a flowchart shown in FIG. 3, a test window 3 shown in FIGS. 1 and 2 is defined. The test window 3 defines the processing range of the image data on the whole or a portion of the electronic part 1 obtained by photographing the electronic part at the time of effecting parts identification. The X-direction of the test window 3 is adjusted by one method or another so that it is parallel with the direction in which the leads 2 are juxtaposed. Such method will not be described herein.

Then, at the step #2 of the flowchart shown in FIG. 3, the image data shown in the test window 3 is multiplied by the lead detecting data 5 for each Y-coordinate so as to convert the image data. Thus, the leads 2 overlap the positive portions of the lead detecting data 5 and are thereby emphasized as a whole. On the other hand, owing to the increase or decrease in the lead detecting data 5, the noise 4 produces emphasized portions and portions having a zero or negative value.

Then, at the step #3 of the flowchart shown in FIG. 3, Y-direction components are added for each Y-coordinate to produce histogram data 6. In the histogram data 6, the data on the leads 2 are always added and thereby emphasized, while the data on the noise 4 are decreased as a whole by addition since they have a zero or negative value.

In this case, there will be no problem even if the negative value produced by multiplication involving the lead detecting data 5 is added as zero when the histogram data 6 is produced.

Figure 8:
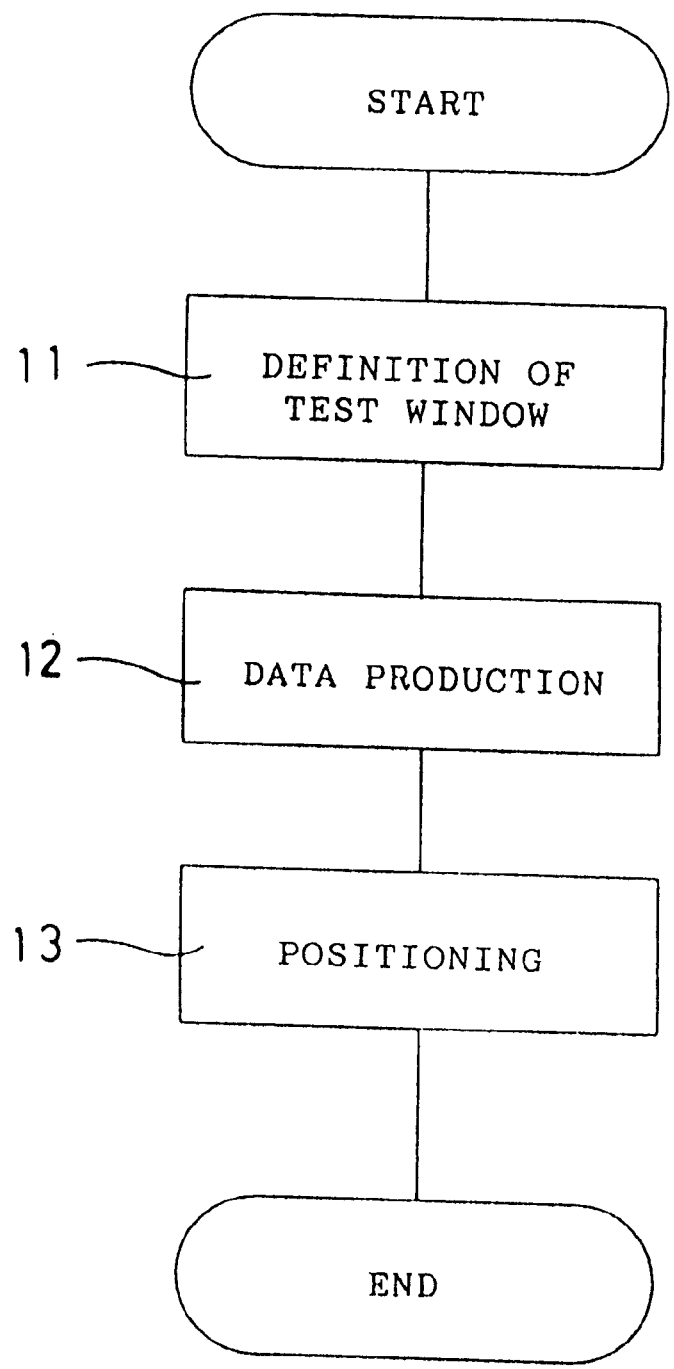
FIG. 8 is a flowchart showing the conventional processing steps.
Figure 9:
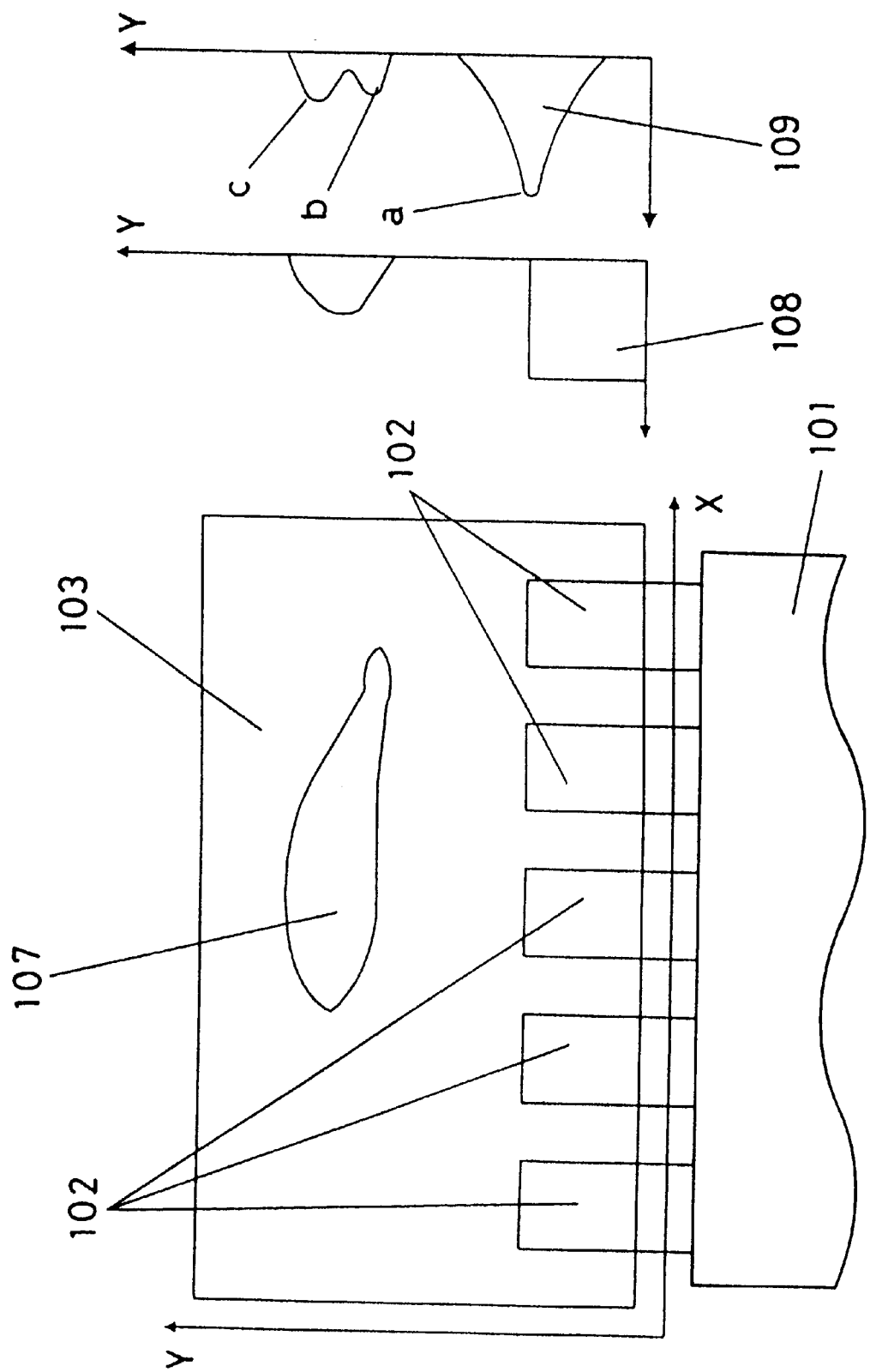
FIG. 9 is a plan view of image data to be processed by the conventional parts identifying method.

The step #4 of the flowchart shown in FIG. 3 is performed in the same manner as at the step #13 of the flowchart in the conventional parts identifying method shown in FIG. 8.

In addition, generally the lead width and lead pitch of leaded electronic parts are constant in most cases. In this case, the lead detecting data can be given in the form of a periodic function. If the lead detecting data is a periodic function, there is a merit that the data itself is small and hence the storage capacity for storing such data can be reduced.

Second Embodiment

In the first embodiment, there may be a case where the phase of the lead detecting data 5 does not exactly coincide with that of the leads 2, depending on the way the test window 3 is determined. In this case, depending on the way the phase deviates, the data on the leads will be attenuated. The second embodiment solves such problem.

First, image data obtained by a parts identifying device for embodying a parts identifying method according to the second embodiment will be described.

Figure 4:
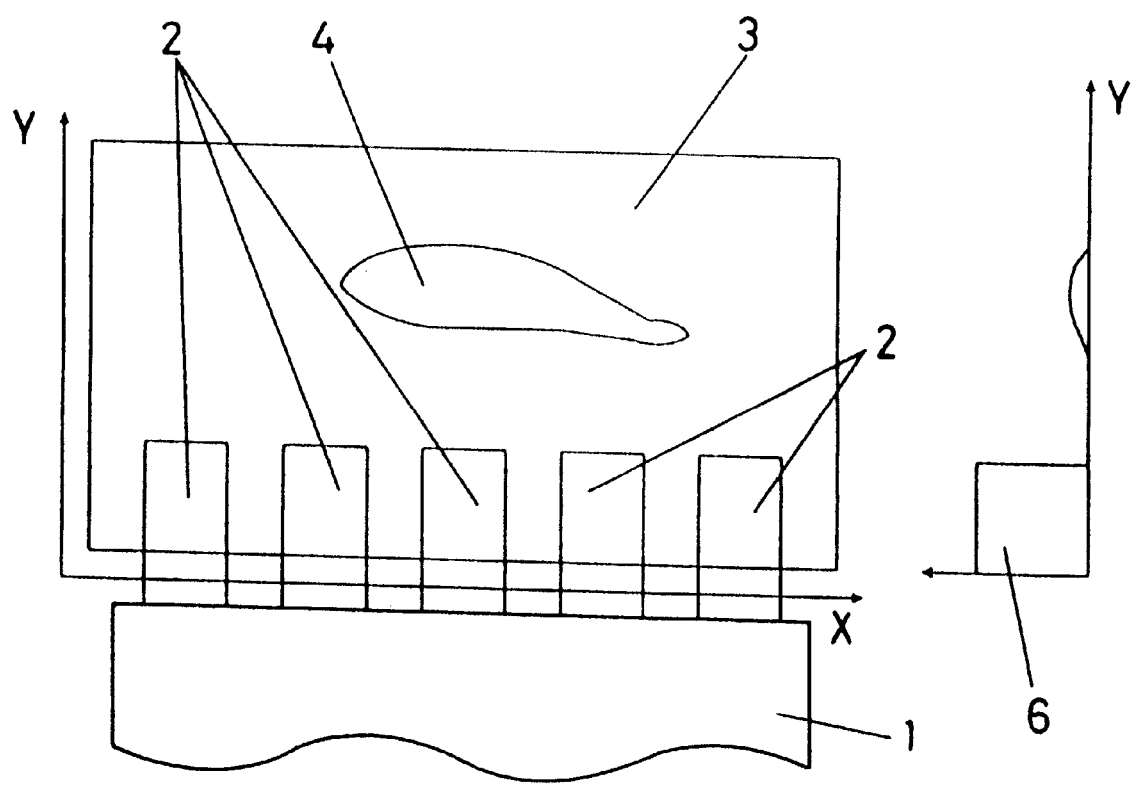
FIG. 4 is a plan view of image data to be processed by a parts identifying method according to a second embodiment of the invention.
Figure 4:
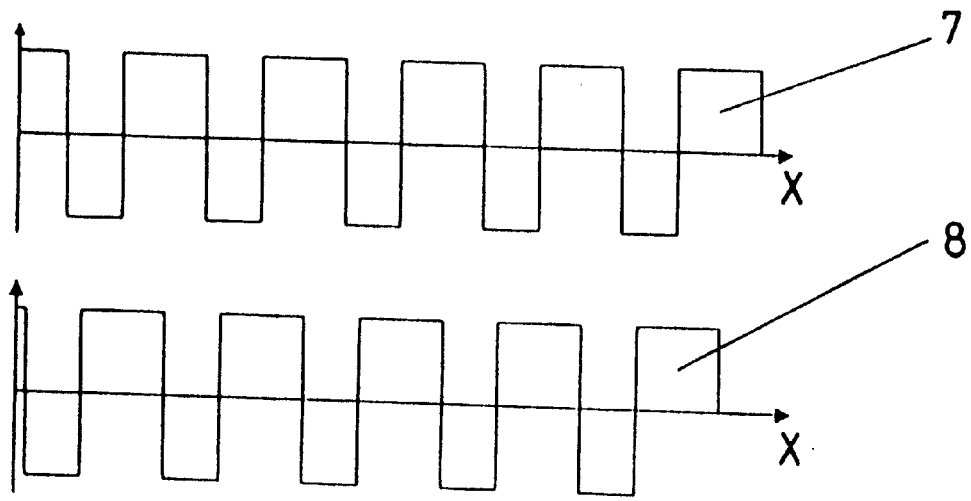

In FIG. 4, the numeral 7 denotes first lead detecting data having a period corresponding to the spacing between leads 2. The numeral 8 denotes second lead detecting data whose phase differs from that of the first lead detecting data 7 by ¼ period.

The rest of the arrangement is the same as in the arrangement of the image data used for describing the parts identifying method according to the first embodiment.

The parts identifying process will now be described with reference to the parts identification method applied to the electronic part 1 depicted in the image data arranged in the manner described above.

First, at the step #2 of the flowchart shown in FIG. 3, the data shown in the test window 3 is multiplied by the first lead detecting data 7. In this embodiment, a case will be considered in which there is a change in the period of the leads and in the first lead detecting data 7. In this case, image data having portions of the leads 2 emphasized is produced by the first lead detecting data 7. The proportion of the emphasized portion varies according to the deviation of the phase. Then, the data shown in the test window 3 is multiplied by the second lead detecting data 8, thereby producing image data in which the portion different from the portion emphasized by the first lead detecting data 7 is emphasized.

Then, at the step #3 of the flowchart shown in FIG. 3, the image data emphasized by the first lead detecting data 7 is added to the image data emphasized by the second lead detecting data 8, thereby producing data. Using the image data thus obtained, the step #4 of the flowchart shown in FIG. 3 is performed in the same manner as in the parts identifying method of the first embodiment, as follows.

Since two pieces of lead detecting data of different phases are used, even if one lead data fails to emphasize, the other one does, and hence the position of the front ends of the leads can be measured.

In addition, in the present embodiments, a description has been given of the case in which the lead width and lead spacing of the leaded electronic part are constant and the lead detecting data is a periodic function; however, even if the lead width and lead pitch are not constant, the invention is applicable in the same manner and the same merits can be obtained by changing the coordinates of the lead detecting data.

In addition, in the present embodiment, the number of pieces of lead detecting data is 2 and the deviation of the phase is ¼ period; however, the number of pieces of lead detecting data and the amount of deviation of the phase are not limited provided that the leads can be emphasized.

Third Embodiment

With the second embodiment, in the case of identifying different types of leaded electronic parts by a single system, the difference in pitch between the types of parts necessitates said histogram data for each type of parts, so that as the number of types of parts to be identified increases, the amount of lead identifying data has to be increased. The third embodiment solves such problem.

The parts identifying process will now be described with reference to a parts identification method according to the third embodiment.

Figure 5:
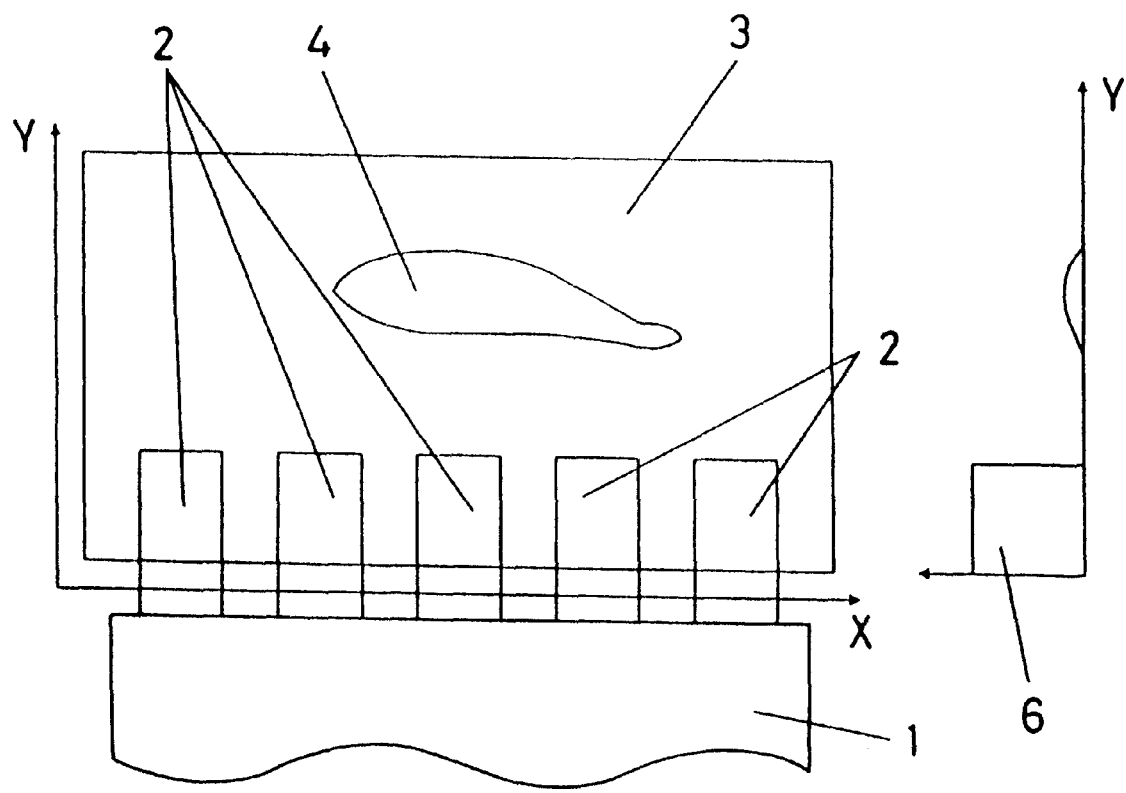
FIG. 5 is a plan view of image data to be processed by a parts identifying method according to a third embodiment of the invention.
Figure 5:
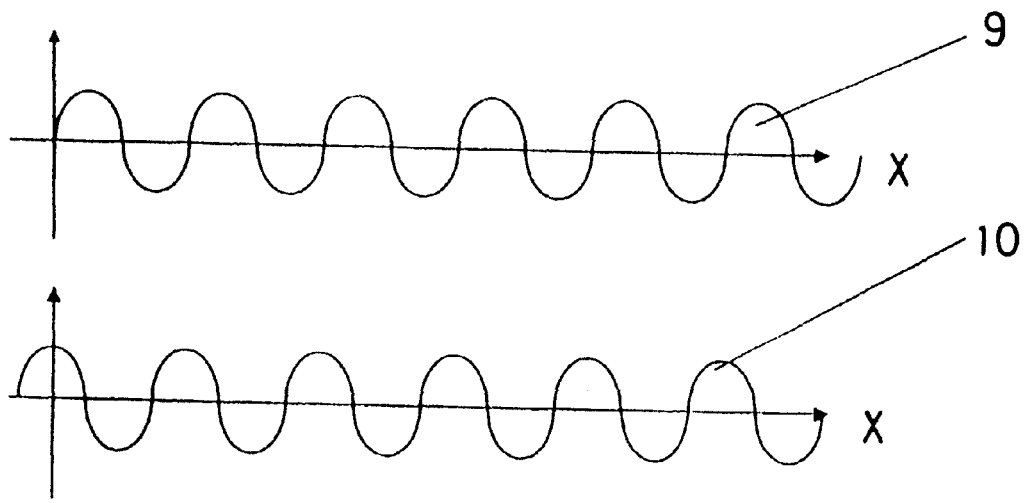

In this parts identifying process, as shown in FIG. 5, first lead detecting data 9 to be used as lead identifying data is defined as a function $b \times \sin(a \times \theta)$. In this case, even if the spacing between the leads 2 of electronic parts 1 varies, the period of these pieces of lead detecting data is always the same as the period of the spacing if the equation $c = 2\pi a$ is satisfied where c is the spacing between the leads; therefore, it is no longer necessary to have lead detecting data for each type of parts.

Further, if the difference in phase between the first lead detecting data 9 and the second lead detecting data 10 is ¼ period as in the case of the second embodiment, then the second lead detecting data 10 can be expressed in a trigonometric function, $b \times \cos(a \times \theta)$. And the amount of the lead detecting data can be reduced.

In addition, even if the b used in the function which provides the first lead detecting data 9 and the second lead detecting data takes any value, the invention can be embodied without any problem while producing the same merits, provided that the leads can be emphasized.

The parts identifying method described in the above embodiments enables the front end position of the leads of a photographed leaded electronic part to be accurately identified even from image data having a mixture of photograph signal and noise signal obtained by photographing the leaded part, without being influenced by noise signals.

What is claimed is:

1. A parts identifying method for identifying the position of an electronic part comprising:

a step for defining, with respect to an electronic part having a plurality of leads to be packaged on a board by an electronic parts packaging plant, a two-dimensional test window having a rectangular coordinate system with the X-axis extending parallel with the direction in which said leads are juxtaposed and the Y-axis perpendicular to said X-axis;

a lead emphasizing step for emphasizing the light intensity of the lead regions of image data obtained by photographing said electronic part in said test window, the lead emphasizing step including using lead detecting data corresponding to a two-dimensional shape of each lead;

a data producing step for producing one-dimensional histogram data which indicates the distribution of light intensity along the Y-axis on the basis of the image data in the lead regions having their light intensity emphasized by said lead emphasizing step; and a positioning step for calculating the Y-coordinate of the lead position in said test window on the basis of the histogram data produced by said data producing step.

2. A parts identifying method for identifying the position of an electronic part comprising:

a step for defining with respect to an electronic part having a plurality of leads to be packaged on a board by an electronic parts packaging plant, a two-dimensional test window having a rectangular coordinate system with the X-axis extending parallel with the direction in which said leads are juxtaposed and the Y-axis perpendicular to said X-axis;

a lead emphasizing step for emphasizing the light intensity of the lead regions of image data obtained by photographing said electronic part in said test window;

a data producing step for producing one-dimensional histogram data which indicates the distribution of light intensity along the Y-axis on the basis of the image data in the lead regions having their light intensity emphasized by said lead emphasizing step; and a positioning step for calculating the Y-coordinate of the lead position in said test window on the basis of the histogram data produced by said data producing step, wherein the lead emphasizing step emphasizes the light intensity of the lead regions in that a multiplication between one-dimensional lead detecting data in which lead-existing positions are assigned a positive value and lead-nonexisting positions a zero or negative value, and as image data in the test window, the values of light intensity of a row of pixels having the same Y-coordinate is performed for all pixels in said row of pixels to convert said image data so as to emphasize the light intensity of the lead regions.

3. A parts identifying method as described in claim 1, wherein the data producing step produces histogram data by adding the values of light intensity of a row of pixels having the same Y-coordinate in the test window.

4. A parts identifying method as described in claim 1, wherein the positioning step calculates the Y-coordinate in the test window on the basis of and corresponding to the point having the highest rate of change of light intensity which is detected from the histogram data.

5. A parts identifying method as described in claim 2, wherein the lead detecting data has a given period.

6. A parts identifying method as described in claim 1, further comprising a step for preparing a plurality of lead detecting data obtained by effecting coordinate transformation on the basis of a lead position having a coordinate axis parallel to the X-axis and calculated from the image data on an electronic part to be identified, with a positive value assigned to the lead-existing position and a zero or negative value to the lead-nonexisting position, such that X-coordinate positions for multiplication involving the image data differ from each other, whereby multiplication between said plurality of lead detecting data and, as image data in the test window, the values of light intensity of a row of pixels having the same Y-coordinate is performed for all pixels in said row of pixels to convert said image data, thereby to emphasize the light intensity of the lead regions.

7. A parts identifying method as described in claim 6, wherein the lead detecting data is a sine wave.

8. A parts identifying method as described in claim 1, wherein the two-dimensional shape of each lead is calculated from shape data of an electronic part to be identified.

* * * * *